Feb. 26, 1952 O. J. ALVAREZ 2,587,427

PHONOGRAPH RECORD

Filed Sept. 18, 1946

INVENTOR.
Octavio Jose Alvarez
BY
Michael S. Striker
his Agent

Patented Feb. 26, 1952 2,587,427

UNITED STATES PATENT OFFICE 2,587,427

PHONOGRAPH RECORD

Octavio Jose Alvarez, New York, N. Y., assignor to Alvarez Patent Corporation, New York, N. Y.

Application September 18, 1946, Serial No. 697,684

3 Claims. (Cl. 274—42)

My present invention relates to phonograph records.

It is an object of my present invention to produce phonograph records which are substantially unbreakable and do not warp even under changing atmospheric conditions.

It is another object of my present invention to provide phonograph records which are not only strong and durable but also very light.

A further object of my present invention consists of phonograph records of the above type which can be manufactured in an easy and simple manner.

Still another object of my present invention consists in new methods of manufacturing phonograph records of the type set forth above.

With the above objects in view, a phonograph record according to my present invention comprises an inner rigid supporting disc member having two opposite faces, a circular edge face and a circular groove in the edge face, two outer circular plastic sheet members each covering one of the two opposite circular faces of the inner rigid supporting disc member and bent along its circular edge into the circular groove in the edge face of the inner rigid supporting disc member, and connecting means firmly securing the two outer circular plastic sheet members along their circular edges in the circular groove on the edge face of the inner rigid supporting disc member to each other so as to completely enclose the disc member.

The sound reproducing grooves are preferably impressed into the flexible foils while the same are still in sheet form. Then the thus impressed sheets are cut into smaller pieces as required for the records and applied to the supporting disc members as explained above.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
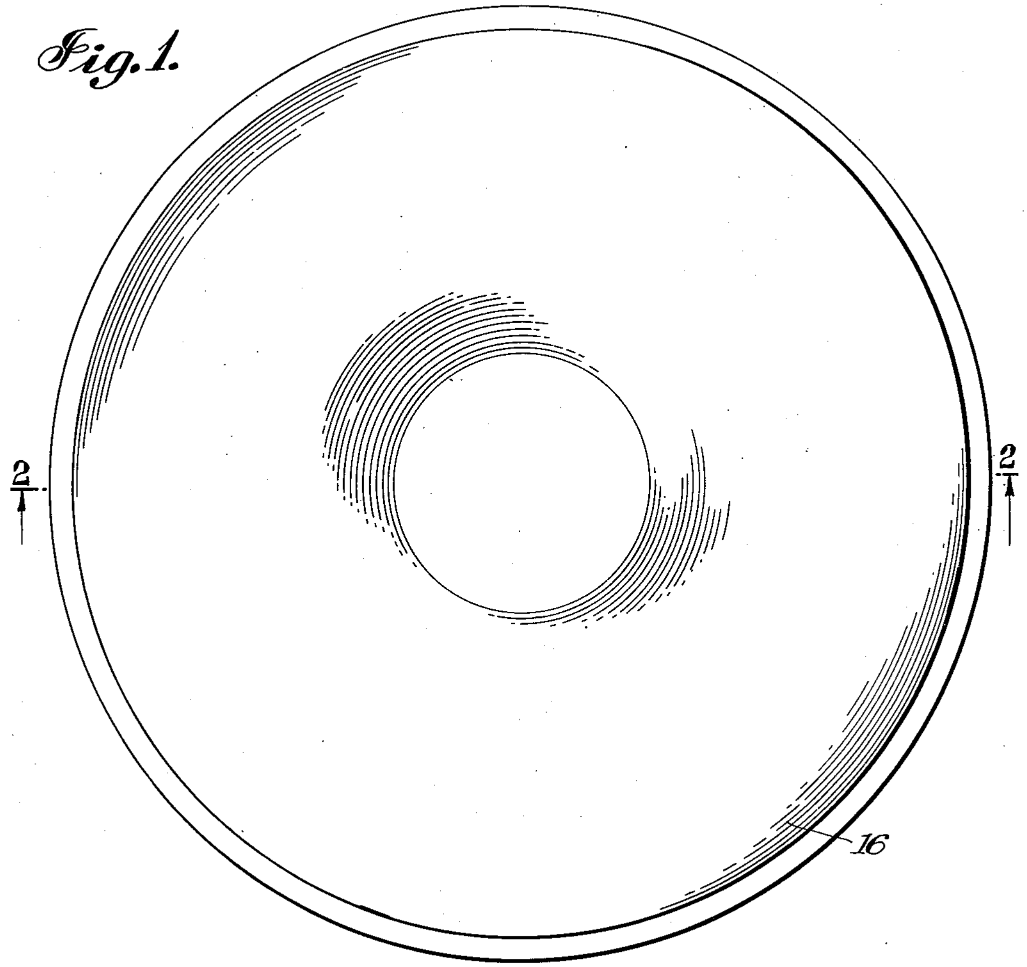
Fig. 1 is a top view of a phonograph record according to my present invention.
Figures 2, 3:
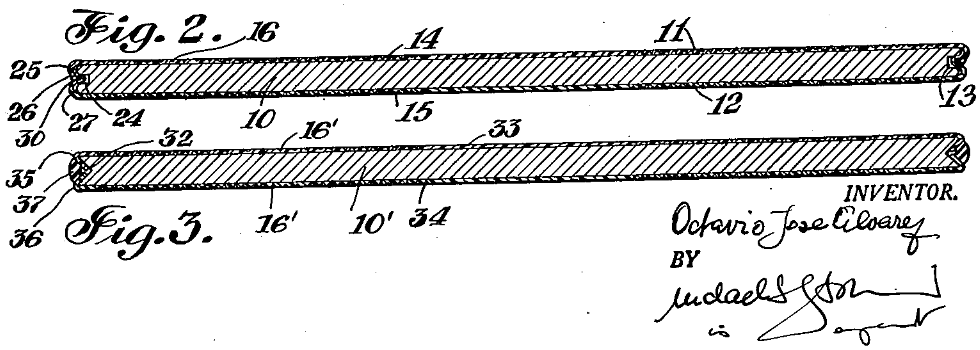
Fig. 2 is a cross-section through the phonograph record shown in Fig. 1, along line 2—2 of Fig. 1.
Fig. 3 is a cross-section of a phonograph record according to another embodiment of the present invention.

The phonograph record shown in Figs. 1 and 2 includes a flat metallic supporting disc member 10, having two circular faces 11 and 12 and an edge face 13. Furthermore, this record comprises two circular foils 14 and 15 consisting of a plastic material. These foils are provided with sound reproducing grooves 16, as shown.

The phonograph record shown in Fig. 2 comprises a supporting disc 10 provided with a groove 24 in its edge face 25. The edge portions 26 and 27 of the plastic foils 14 and 15, respectively, reach into this groove 24 and are heat sealed or otherwise fused to each other at 30. An arrangement of this type prevents unintentional opening of the fusing seam along the edge of the record; furthermore, provision of the groove 24 and of the inwardly bent edge portions 26 and 27 of the plastic foils 14 and 15 increases the friction between these foils and the supporting disc 10, thus preventing relative turning of the same.

The record shown in Fig. 3 includes a metallic disc 10′ provided at its edge with a groove 32 having a V-shaped cross-section. The two foils 33 and 34 covering disc 10′ and provided with sound-reproducing grooves 16′ have inwardly bent edge portions 35 and 36, respectively. These edge portions reach into the groove 32 and are held therein by the elastic rubber band 37 which is pressing against the edge portions and prevents unintentional slipping out of the same.

A record of the type described in the preceding paragraph has the advantage that the foils 33 and 34 provided with the sound-reproducing grooves 16′ might be exchanged by the user, whenever desired, by simply removing the elastic rubber band 37, exchanging the foils 33 and 34 and placing the rubber band back into the operative holding position shown in Fig. 3.

I wish to state that I have described above only phonograph records embodying metallic supporting disc members. Of course, it is also possible to produce such disc members if desired out of other materials. The only requirements are that the materials used be substantially nonbreakable, preferably light in weight, and that the discs made of such materials do not warp.

Phonograph records of the above-mentioned type are manufactured in accordance with my present invention by impressing sound-reproducing grooves into one or more sheets of thin, preferably thermoplastic foils, cutting out of the thus impressed sheets circular foil pieces, each containing sound-reproducing grooves, placing the thus cut-out pieces of foil on the two faces of a supporting disc and securing the edges of the foils to each other and/or the edge of the disc in one of the ways shown in Figs. 1 to 3.

It will be understood that each of the elements described above, or two or more together, may also find a useful application in other types of phonograph records differing from the types described above.

While I have illustrated and described the invention as embodied in phonograph records composed of metallic discs and plastic foils, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. A phonograph record comprising an inner rigid supporting disc member having two opposite circular faces, a circular edge face and a circular groove in said edge face; two outer circular plastic sheet members each covering one of said two opposite circular faces of said inner rigid supporting disc member and bent along its circular edge into said circular groove in said edge face of said inner rigid supporting disc member; and connecting means firmly securing said two outer circular plastic sheet members along their circular edges in said circular groove in said edge face of said inner rigid supporting disc member to each other so as to completely enclose said disc member.

2. A phonograph record comprising an inner rigid supporting disc having two opposite circular faces, a circular edge face and a circular groove in said edge face; and two outer thermoplastic flexible foil members each covering one of said two opposite circular faces of said inner rigid supporting disc and bent along its circular edge into said circular groove in said edge face of said inner rigid supporting disc, the bent circular edge portions of said outer thermoplastic flexible foil member located in said circular groove in said edge face of said inner rigid supporting disc being united so as to completely envelope said disc.

3. A phonograph record comprising an inner rigid supporting disc having two opposite circular faces, a circular edge face and a circular groove in said edge face; two outer thermoplastic flexible foil members each covering one of said two opposite circular faces of said inner rigid supporting disc and bent along its circular edge into said circular groove in said edge face of said inner rigid supporting disc, the bent circular edge portions of said outer thermoplastic flexible foil member located in said circular groove in said edge face of said inner rigid supporting disc being united so as to completely envelope said disc; and sound reproducing grooves impressed in at least one of said outer circular sheet members.

OCTAVIO JOSE ALVAREZ.

REFERENCES CITED

The following references are of record in the file of this patent:

UNITED STATES PATENTS

| Number | Name | Date |
|---|---|---|
| 819,058 | Godwin et al. | May 1, 1906 |
| 1,946,596 | Symonds | Feb. 13, 1934 |
| 2,008,092 | Biber | July 16, 1935 |
| 2,029,102 | Hilhouse | Jan. 28, 1936 |
| 2,106,623 | Proctor et al. | Jan. 25, 1938 |
| 2,272,157 | Spinner | Feb. 3, 1942 |
| 2,294,796 | Moulder | Sept. 1, 1942 |